UNITED STATES PATENT OFFICE.

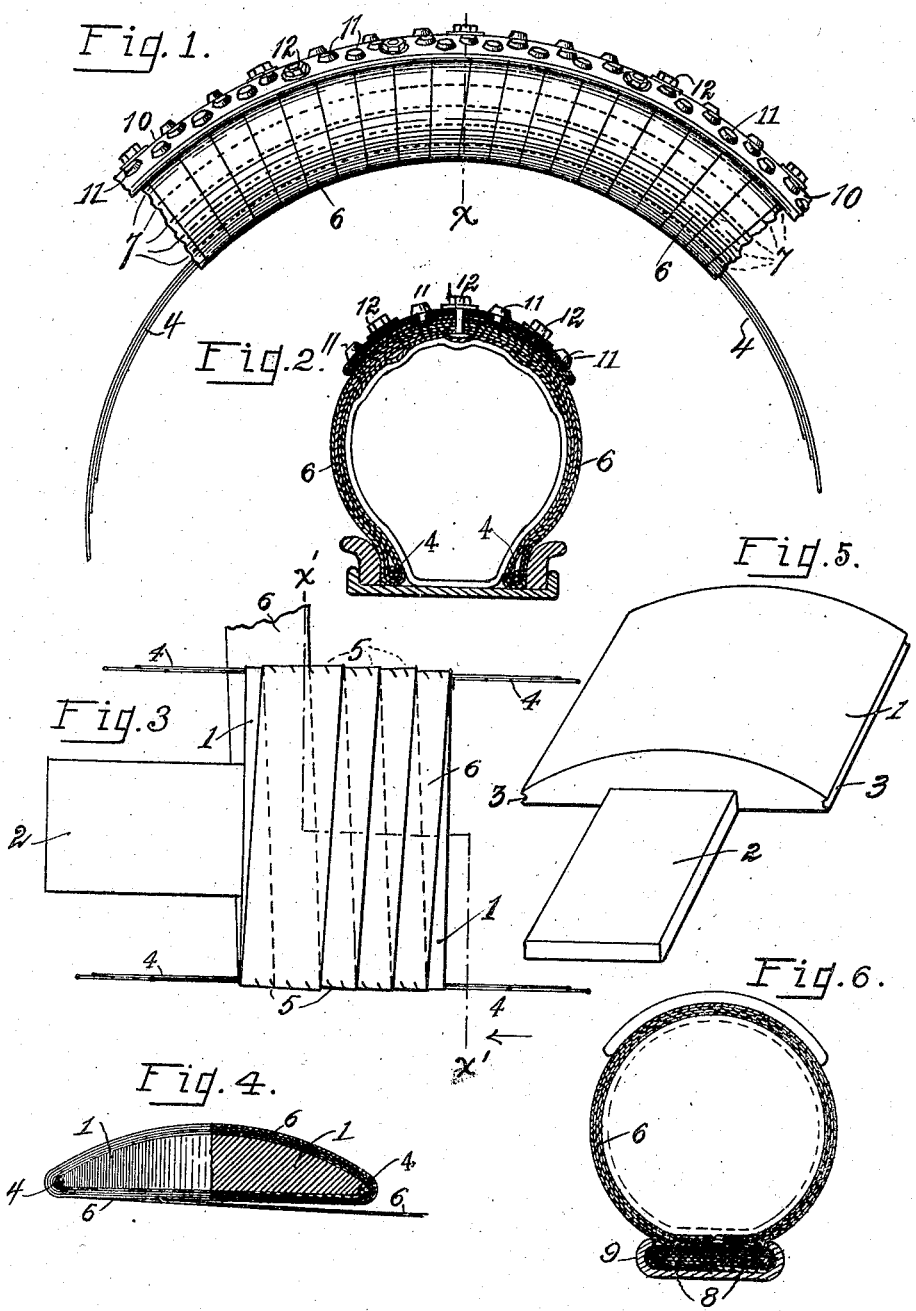

DAVID P. BOYD, OF TOLEDO, OHIO.

TIRE FOR VEHICLES.

No. 918,820.     Specification of Letters Patent.     Patented April 20, 1909.

Application filed November 23, 1907. Serial No. 403,433.

*To all whom it may concern:*

Be it known that I, DAVID P. BOYD, a citizen of the United States, residing at Toledo, in the county of Lucas and State of Ohio, have invented certain new and useful Improvements in Tires for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

A serious difficulty attending the use of modern pneumatic automobile-tires is the original cost and short life of the outer tube or casing for the inner pneumatic tube. This is due largely to the fact that the outer tube or casing is composed, in the main, of india rubber which is not adapted to withstand abrasion or severe strains and which suffers deterioration from atmospheric and other chemical influences.

My invention relates to an outer tire or casing for pneumatic tires which shall largely overcome the objections here indicated; which shall be composed entirely of a suitable woven fabric treated with some suitable water proofing substance and in which no india rubber is employed; in which the fabric of which the device is composed is in a single strip wound in such fashion as to give the necessary thickness without wrinkles or folds, and which shall be cheap, strong, and extremely durable. I attain these objects by means of the construction hereinafter described and shown, and illustrated in the accompanying drawings, in which,—

Figure 1 is a side-elevation of a segment of my completed tire; Fig. 2, a transverse sectional elevation of the same taken on line *x—x*, Fig. 1; Fig. 3, a top-plan view of a form with a strip of fabric wound thereon illustrating the manner of forming the windings of my tire; Fig. 4, a transverse sectional elevation of the device illustrated in Fig. 3, taken on line *x'—x'*; Fig. 5, a perspective view of the form upon which my tire is wound, and Fig. 6, a transverse sectional elevation of my tire provided with a modified form of flanges for engagement with the clamping devices of a wheel-rim.

Like numerals of reference indicate like parts throughout the drawings.

My tire may be best described by giving in detail the manner of constructing the same.

In the drawings, 1 is a form the top of which is curved in the arc of a circle, the bottom forming a chord of the circle and being flat or nearly so. Projecting from one end of the form and rigidly secured thereto is a flat bar 2 which is designed to be secured to the top of a bench or table by clamps or screws in such manner that the form projects beyond the edge of the table or bench. In the opposite edges of the form where the curved and flat surfaces meet are grooves 3—3 for the reception of a wire hoop or groups of wire hoops corresponding in diameter with the inner diameter of the completed tire. The groups of wires 4 are first put in place. Now I take a long strip, 6, of woven fabric such, for instance, as heavy duck or canvas, say,—for illustration,—two and one-half inches in width. I now wrap the strip of canvas spirally around the form 1, as illustrated in Fig. 3, so that in the windings one and one-half inches are covered leaving exposed an inch of the fabric. As the windings proceed the wire hoops are basted into place, as shown at 5, (Fig. 3), which also keeps the windings in proper relation, and as fast as the irregular shaped tube is formed by the spiral windings of the strip of fabric it is forced off from the form,—away from the bench or table. It will be seen that the flexible tube thus formed as it leaves the form is round on its top side and flat across its bottom side. Now if the two edges of the tube be brought together the short underside will bend upwardly and will fit into and against the underside of the curved top and the two thicknesses together will form a crescent-shaped figure composed substantially of four thicknesses of the canvas strip, the inner and outer layers crossing each other at a slight angle. The winding of the strip proceeds until a tube of sufficient length to form the complete tire has been produced, when the two ends of the strip are secured together or to the windings and the two ends of the tube are brought together to form the tube into an unbroken circle of the circumference of the wheel for which it is designed.

As the windings of the canvas tube pass, step by step, from the form, the flat and the curved sides of the tube are brought together as above described, the windings are adjusted radially and are now stitched by suitable machinery lengthwise of the tube as illustrated at 7 in Fig. 1. Now the inner and outer stretches of the tire-wrappings are securely and permanently secured in fixed relation. The tube or tire thus formed is now ready for treatment with a suitable water-proofing substance. The wires 4 being in place in the bights of the folded windings form extremely strong ribs or rings by means of which the tire may be secured in place upon the rim of a wheel in a well known manner, as illustrated in Fig. 2. If preferred, the wires 4 may be omitted and in their stead heavy folded bands 8 of the woven fabric may be stitched to the margins of the tube as illustrated in Fig. 6, these folded bands serving as means for engagement with a clenching device 9, of well known construction.

It will be seen that the tire formed as above described consists of but a single piece of fabric disposed in four layers firmly sewed together; that the tire is symmetrical in cross-section with no surplus folds or wrinkles in the cloth to be taken care of, and, as is obvious, the construction is exceedingly cheap, strong, and durable. It will be seen that in case of punctures or tears my tire may be readily and effectively repaired by cutting out the injured portion, then supplying new windings in the place of those removed, and then stitching and water-proofing the new part as in the first instance.

In Figs. 1 and 2 of the drawings I have shown how a studded belt or breaker-strip 10 may be secured to the periphery of my tire as a shield against abrasion and puncture and to prevent "skidding". This circumferential guard I find in practice may be composed quite satisfactorily of the same material as that of which the tire is formed, the fabric being folded into several thicknesses securely stitched together, and provided with the metal studs 11, which pass through the belt or shield only. The belt or shield is secured in place upon the tire by threaded bolts,— passing through both the tire and belt,— and nuts 12. The studs 11 are preferably riveted in place. The bolts and nuts 12 render the belt interchangeable and permit the ready and convenient attachment and removal of the studded belt for renewals and repairs. The bolts and nuts 12 also aid in securing the wrappings of the tire in proper relation when the belt 10 is in place.

Having described my invention, what I claim and desire to secure by Letters Patent is,—

1. A vehicle tire composed of a strip of fabric wound spirally into tubular form, one side of such tube being bent inwardly and disposed against the inner surface of the outer side of the tube, said two sides of said tube being secured together in fixed relation.

2. A vehicle tire composed of a strip of fabric wound spirally into a tube sector-shaped in cross-section, the shorter side of the tube being bent inwardly and disposed against the inner surface of the longer side of the tube, said two sides of the tube being secured together in fixed relation.

3. In a vehicle tire composed of a strip of fabric wound spirally into tubular form, one side of the tube being bent inwardly and disposed against the inner surface of the other side of the tube, means for securing the two sides of such tubes in fixed relation, and devices upon such tire for engagement with a wheel-rim.

4. In a vehicle tire composed of a strip of fabric wound spirally into tubular form, one side of such tube being bent inwardly and secured against the inner surface of the other side of the tube, wire hoops inclosed in the bights of such bend.

In testimony whereof I affix my signature in presence of two witnesses.

DAVID P. BOYD.

Witnesses:
 WM. C. BINNS,
 ADA E. CAMERON.